April 23, 1946.   J. J. DANIELS   2,398,924
WORK HOLDER FOR MACHINE TOOLS
Filed July 15, 1944
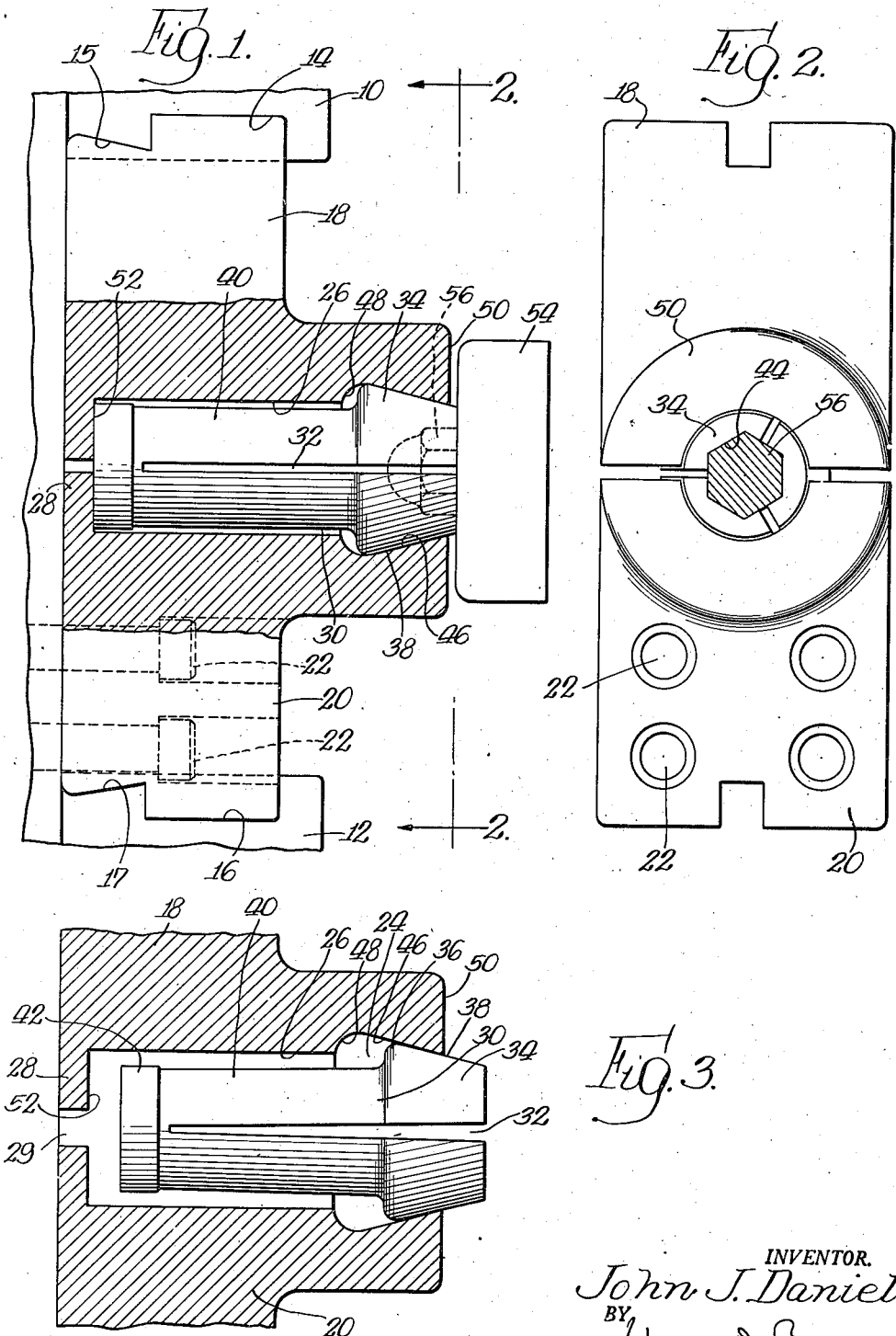
INVENTOR.
John J. Daniels,
BY
Atty.

Patented Apr. 23, 1946

2,398,924

UNITED STATES PATENT OFFICE 2,398,924

WORK HOLDER FOR MACHINE TOOLS

John J. Daniels, Chicago, Ill., assignor to The Imperial Brass Manufacturing Company, Chicago, Ill., a corporation of Illinois Application July 15, 1944, Serial No. 545,168

5 Claims. (Cl. 279—46)

My invention relates to machine tools and particularly a means for holding the work in the machine.

Among the objects of my invention is to provide a new and improved work holder which serves as a quick and efficient means for securing cast slugs in a machine tool so that they may be accurately machined.

Another object of my invention is to provide a new and improved chucking device especially adapted to use on automatic machine tools which are designed to machine castings.

Still another object of my invention is to simplify the jaw construction on automatic machine tools so that it will not be necessary to make a separate set of jaws in order to fit every different shape and style of cast slug which may be sought to be machined.

A further object is to provide an inexpensive accessory in the nature of a collet designed for use with a uniform set of jaws, the collets being interchangeable and adapted to receive and clamp work pieces having different shapes and sizes.

A still further object of my invention is to provide a collet construction of the jaw for an automatic machine tool having a sufficiently versatile character so that it may accurately clamp castings which may be slightly out of size or which may have rough spots upon them which would prevent their being held in the machine by the conventional type of jaw.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a side view of the work holder partly in section showing the device in clamped position upon the work.

Figure 2 is an end view taken on the line 2—2 of Figure 1.

Figure 3 is a fragmentary section similar to the central portion of Figure 1 showing jaws and collet in released position.

Many types of work holding devices and chucking arrangements have been provided for machine tools. As a rule these are especially adapted to the particular type of machine tool with which they are to be used. On hand lathes, for example, a collet is frequently used which in itself can be shifted in an axial direction against a deflecting collar in order to clamp the work.

In machines commercially known as casting automatic machines and machines of this general description jaws are used. In that case a separate set of jaws must be provided with a recess of special shape to accommodate each and every different kind of casting slug which is to be machined by the device. By reason of the fact that commercial castings run quite non-uniform in size and shape the first machining operation performed while the slug is held in a set of jaws may not be sufficiently accurate for all purposes. In practice it has been found that a chucking device utilizing the collet principle has many advantages in holding work which may be somewhat non-uniform in size and shape. No satisfactory way has been found prior to the invention here involved of utilizing a collet in conjunction with the jaws which are a necessary part of the construction of the average casting automatic machine.

There is also considerable economy in the use of interchangeable collets instead of interchangeable jaws. Collets are of relatively inexpensive construction and involve only a small amount of metal. They can be accurately machined and provided with a suitable aperture for receiving work having a symmetrical shape. Jaws on the contrary are of relatively expensive construction. They are quite bulky, must be accurately machined to fit the chuck in the machine with which they are to be used and in addition must have a cavity sunk in each jaw which will align properly with the cavity in the other jaw when the jaws are in place in the machine tool.

To make jaw cavities, it is, of course, necessary to have the metal soft initially and then to harden it after the operation has been completed. When a different set of jaws must be made for each and every different shape and size of slug the expense involved is very appreciable.

In the drawing there is shown a chuck having an upper part 10 and a lower part 12 forming part of a machine tool such as a casting automatic machine. The chucks are provided with laterally extending recesses 14, 15, 16 and 17 designed to receive the jaws. These jaws are two in number with the jaw 18 shown above and the jaw 20 shown below in Figure 1. The jaw 20 appears bolted to the chuck by means of bolts 22. Each jaw is provided with a somewhat semi-cylindrical recess provided with a large outer end 24 and a cylindrical inner end 26. At the rear of the recess is a wall or shoulder 28 and a passage 29.

Adapted to be received within the apertures of the jaws is a divided spring collet 30 having slits 32 along several sides in order to permit the separate segments of the collet to separate when occasion requires.

In one embodiment of my invention the collet is provided with a head 34 having a relatively wide base 36 rounded at the edge and a tapered slope 38. A relatively cylindrical shank 40 is shown attached to the large end of the head and extends inwardly in respect to the open end of the jaws. A flange 42 is provided at the inner end of the shaft, as best seen in Figure 2. The collet is provided with a hexagonal work holding aperture 44 in this case for holding a hexagonal portion of the work. The aperture, of course, extends entirely through the collet.

It should be noted that the recesses in the jaws are each provided with a large outer end having a tapered slope 46 which is of the same slope as the sloping outer portion 38 of the head of the collet. The inside corner 48 of the large tapered end has a well-rounded bevel. It should be noted that the depth of the large tapered end of the recess from the face 50 of the jaws to the innermost end is somewhat greater than the clamped portion of the head of the collet. It should also be noted that the overall depth of the recesses in the jaws, namely, the distance from the face 50 to an internal shoulder 52 is somewhat less than the length of the collet as shown in Figure 1.

In operation the jaws are initially separated from each other as shown in Figure 3. When in this position the segments of the collet spring outwardly to a slight extent as shown. In some set-ups the jaws may separate to such an extent that the collet, though sprung open, will merely continue to lie in one of them without following it toward the open end of the recess in the jaws.

The collet in the drawing is adapted to hold a work piece having a hexagonal end 56. When this collet is to be clamped in the jaws the hexagonal portion is first inserted into the hexagonal aperture of the collet, while the collet is sprung outwardly in the position shown in Figure 3. Then through some mechanical means of a conventional sort the jaws are pressed together into the position shown in Figure 1. During this movement the sloping surface 46 of the large recess is pressed against the correspondingly sloping surface 38 of the collet and forces the collet inwardly or from right to left as shown in Figures 3 and 1. The collet is so designed with respect to the size of the recess that the head end will be shifted inwardly until it is clamped upon the hexagonal portion of the work and the inner end 42 of the shank abuts against the shoulders 52 of the jaws. The enlarged end 24 of the recess being always longer than the clamped length of the head of the collet will always permit the collet to move freely without the inner end of the head coming into contact with the inside end of the recess adjacent thereto.

There has therefore been provided a collet-type work holding device which can be used in casting automatic machine tools and machines of a generally similar character, the collets being interchangeable within certain limits of size with the same set of jaws.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a machine tool work holder a pair of relatively movable jaws adapted to be secured in place in a machine tool and a divided spring collet having a central aperture of the same shape as the part of the work to be held therein, a head end on said collet tapered inwardly toward the work holding aperture, an elongated shank and a flat lateral face directed toward the end opposite the head, said collet having slits extending from the head end inwardly along the shank to a point spaced from the other end, each set of jaws having an internal recess adapted to receive the collet, said recess comprising a large outer end tapered to correspond with the head of the collet having a length greater than the length of the clamped portion of the collet and a substantially cylindrical inner end adapted to receive the shank, the overall length of the jaw recess being less than the overall length of the collet, said jaws having an open position separated one from the other and from the collet wherein the collet is released and expanded for reception and release of the work and having a closed position wherein the collet is clamped upon the work and the inner end face is in contact with the internal shoulder in one of the jaw recesses.

2. In a machine tool work holder a pair of jaws adapted to be secured in place respectively in a pair of relatively movable chuck parts and a divided spring collet having a central aperture of the same shape as the part of the work to be held therein, a head on said collet tapered inwardly toward the work holding aperture and an elongated shank smaller in diameter than the wide portion of the head, said collet having a plurality of slits extending from the head end inwardly along the shank to a point spaced from the other end, each set of jaws having complementary halves of a recess adapted to receive the collet, said recess comprising a large outer end tapered to correspond with the head of the collet having a length greater than the length of the clamped portion of the collet and a cylindrical inner end adapted to receive the shank, an abutting shoulder at the inner end of the recess, said jaws having an open position separated one from the other and from pressure contact with the collet wherein the collet is released and expanded for reception or release of the work and having a closed position wherein the collet is clamped upon the work and the end of the shank is in contact with the abutting shoulder.

3. In a machine tool work holder a pair of relatively movable jaws adapted to be secured in place in a machine tool and a divided spring collet having a central aperture of the same shape as the part of the work to be held therein, a head end on said collet tapered inwardly toward the work holding aperture and an elongated shank, said collet having slits extending from the head end inwardly along the shank to a point spaced from the other end, each set of jaws having complementary halves of a recess adapted to encompass the collet, said recess comprising an outer end tapered to correspond with the head of the collet, a cylindrical inner end adapted to receive the shank and an abutting shoulder at the inner end of the recess, the overall length of the jaw recess being less than the overall length of the clamped portion of the collet, said jaws having an open position separated one from the other and from pressure contact with the collet wherein the collet is released and expanded for reception and release of the work and having a closed position wherein the collet is clamped upon the work and the end of the shank is in contact with the inner end of said recess.

4. In a machine tool work holder a pair of jaws adapted to be secured in place respectively in a pair of relatively movable chuck parts and a divided spring collet having a central aperture of the same shape as the part of the work to be clamped, a head on said collet tapered toward the work holding aperture and an elongated shank smaller in diameter than the wide portion of the head, said collet having a plurality of slits extending from the head end inwardly along the shank to a point spaced from the other end, each of the jaws having a recess having a closed inner end adapted to receive one side of the collet, said recess comprising a large outer end tapered to correspond with the head of the collet having a length greater than the length of the clamped portion of the collet and a depth less than one half the large diameter of the head of the collet, said recess having a semi-cylindrical inner end adapted to receive the shank, the overall length of the recess being less than the overall length of the collet, said jaws having an open position separated one from the other and from pressure contact with the collet wherein the collet is released and expanded for reception or release of the work, and having a closed position wherein the collet is clamped upon the work and the end of the shank is in contact with the closed inner ends of said recesses.

5. In a machine tool work holder, a plurality of radially movable jaws and a collet, said collet having a recess opening through one end thereof shaped the same as the work piece to be held therein, the outer surface of the recessed end of said collet tapering outwardly from the recessed end inwardly and slits extending from the recessed end inwardly to a point spaced from the other end, each of said jaws having an elongated recess therein jointly forming a recess for the reception of said collet therein for movement longitudinally thereof, said jointly formed recess tapering at its outer end to correspond to the tapered portion of said collet, and cooperating means on the jaws and the collet limiting relative inward movement of said collet upon radial inward movement of said jaws.

JOHN J. DANIELS.